(12) United States Patent
Lauridsen et al.

(10) Patent No.: US 8,495,048 B2
(45) Date of Patent: Jul. 23, 2013

(54) APPLYING USER-GENERATED DEPLOYMENT EVENTS TO A GROUPING OF DEPLOYABLE PORTLETS

(75) Inventors: Christina K. Lauridsen, Austin, TX (US); Lauren G. Wilcox, New York, NY (US)

(73) Assignee: International Business Machines, Armonk, NY (US)

( * ) Notice: Subject to any disclaimer, the term of this patent is extended or adjusted under 35 U.S.C. 154(b) by 361 days.

(21) Appl. No.: 12/547,853

(22) Filed: Aug. 26, 2009

(65) Prior Publication Data

US 2011/0055193 A1 Mar. 3, 2011

(51) Int. Cl.
G06F 17/30 (2006.01)

(52) U.S. Cl.
USPC ............................ 707/706; 707/707; 707/770

(58) Field of Classification Search
USPC .................. 707/705, 712, 805, 706, 707, 770
See application file for complete search history.

(56) References Cited

U.S. PATENT DOCUMENTS

| | | | |
|---|---|---|---|
| 5,995,106 A | 11/1999 | Naughton et al. | |
| 6,208,995 B1 | 3/2001 | Himmel et al. | |
| 6,411,996 B1 | 6/2002 | Albers | |
| 6,643,641 B1 | 11/2003 | Snyder | |
| 6,725,227 B1 | 4/2004 | Li | |
| 6,931,416 B2 | 8/2005 | Kelley et al. | |
| 6,941,339 B1 | 9/2005 | McMichael | |
| 6,959,319 B1 | 10/2005 | Huang et al. | |
| 7,003,735 B2 | 2/2006 | Edlund et al. | |
| 7,062,511 B1 | 6/2006 | Poulsen | |
| 7,076,463 B1 * | 7/2006 | Boies et al. | 705/39 |
| 7,096,219 B1 | 8/2006 | Karch | |
| 7,139,978 B2 | 11/2006 | Rojewski et al. | |

(Continued)

FOREIGN PATENT DOCUMENTS

| | | |
|---|---|---|
| DE | 10015173 | 10/2001 |
| JP | 2005506617 A | 3/2005 |

(Continued)

OTHER PUBLICATIONS

Del.icio.us, retrieved from the Internet on May 17, 2008 at http://del.icio.us/, Yahoo! Inc., 701 First Avenue, Sunnyvale, CA 94089, 3 pages.

(Continued)

*Primary Examiner* — Thanh-Ha Dang
(74) *Attorney, Agent, or Firm* — Stephen R. Tkacs; Stephen J. Walder, Jr.; William J. Stock (57) ABSTRACT

A mechanism is provided for applying individual user-generated deployment events to a grouping of bookmarked deployable Web archive files. The mechanism allows a user of a bookmarking service for deployable Web archive files to group bookmarked Web archive files according to criteria, such as tag names, and to perform actions, such as a deploy action, to all members of the group in a single user-generated event. The mechanism allows a user to perform a search of portlets meeting specified criteria. The user may then select portlets from the result set for deployment as a group. The mechanism also allows a user of the bookmarking service to tag pre-configured portlet groupings, or portal tabs. Users may choose to deploy not just a tagged portlet, but an entire tab of portlets in a single deployment action. The mechanism may also allow a user to deploy a collection of portal tabs.

15 Claims, 5 Drawing Sheets

U.S. PATENT DOCUMENTS

| | | | |
|---|---|---|---|
| 7,178,096 B2 | 2/2007 | Rangan et al. | |
| 7,185,089 B2 | 2/2007 | Satomi et al. | |
| 7,200,568 B2 | 4/2007 | Dodd | |
| 7,203,909 B1 | 4/2007 | Horvitz et al. | |
| 7,216,287 B2 | 5/2007 | Colson et al. | |
| 7,269,664 B2 | 9/2007 | Hutsch et al. | |
| 7,289,983 B2 | 10/2007 | Best et al. | |
| 7,337,370 B2 | 2/2008 | Haynes et al. | |
| 7,366,795 B2 | 4/2008 | O'Neil et al. | |
| 7,366,990 B2 | 4/2008 | Pitroda | |
| 7,376,652 B2 | 5/2008 | Hayes-Roth | |
| 7,426,548 B2 | 9/2008 | Griffin et al. | |
| 7,536,637 B1 | 5/2009 | Nauerz et al. | |
| 7,624,160 B2 | 11/2009 | Henderson et al. | |
| 7,770,101 B2 | 8/2010 | Hesmer et al. | |
| 7,895,234 B2 | 2/2011 | Lillie et al. | |
| 7,904,818 B2 | 3/2011 | Lauridsen et al. | |
| 7,949,692 B2 | 5/2011 | Lemar et al. | |
| 2001/0034771 A1 | 10/2001 | Hutsch et al. | |
| 2002/0029296 A1 | 3/2002 | Anuff et al. | |
| 2002/0152242 A1 | 10/2002 | Meyer et al. | |
| 2003/0101412 A1 | 5/2003 | Eid | |
| 2003/0148763 A1* | 8/2003 | Kikuchi | 455/433 |
| 2004/0010598 A1 | 1/2004 | Bales et al. | |
| 2004/0049589 A1 | 3/2004 | Papanikolaou et al. | |
| 2004/0167896 A1* | 8/2004 | Eakin | 707/10 |
| 2004/0187111 A1* | 9/2004 | Eakin | 718/100 |
| 2004/0243928 A1 | 12/2004 | Hesmer et al. | |
| 2005/0065913 A1 | 3/2005 | Lillie et al. | |
| 2005/0246632 A1 | 11/2005 | Guido et al. | |
| 2005/0256940 A1 | 11/2005 | Henderson et al. | |
| 2005/0267789 A1 | 12/2005 | Satyadas et al. | |
| 2005/0273717 A1 | 12/2005 | Breeden et al. | |
| 2005/0278323 A1 | 12/2005 | Horvitz et al. | |
| 2005/0278562 A1 | 12/2005 | Haynes et al. | |
| 2006/0026557 A1 | 2/2006 | Petri | |
| 2006/0031849 A1 | 2/2006 | Barta et al. | |
| 2006/0036734 A1 | 2/2006 | Breeden et al. | |
| 2006/0036954 A1* | 2/2006 | Satyadas et al. | 715/742 |
| 2006/0053376 A1* | 3/2006 | Ng et al. | 715/742 |
| 2006/0059125 A1 | 3/2006 | Yan | |
| 2006/0064406 A1 | 3/2006 | Ehrich et al. | |
| 2006/0064422 A1* | 3/2006 | Arthurs et al. | 707/10 |
| 2006/0095676 A1 | 5/2006 | Dzierzon et al. | |
| 2006/0277199 A1* | 12/2006 | Joret et al. | 707/10 |
| 2006/0282819 A1* | 12/2006 | Graham et al. | 717/113 |
| 2006/0287919 A1* | 12/2006 | Rubens et al. | 705/14 |
| 2007/0016893 A1 | 1/2007 | Branda et al. | |
| 2007/0038599 A1 | 2/2007 | Pearson | |
| 2007/0043766 A1 | 2/2007 | Nicholas et al. | |
| 2007/0067722 A1* | 3/2007 | Ames et al. | 715/709 |
| 2007/0094595 A1 | 4/2007 | Heck et al. | |
| 2007/0112913 A1 | 5/2007 | Bales | |
| 2007/0260702 A1 | 11/2007 | Richardson et al. | |
| 2007/0288488 A1* | 12/2007 | Rohrs et al. | 707/100 |
| 2007/0300179 A1 | 12/2007 | Friedlander | |
| 2008/0016116 A1 | 1/2008 | Tarr | |
| 2008/0033921 A1* | 2/2008 | Arrouye et al. | 707/3 |
| 2008/0034420 A1 | 2/2008 | Chang | |
| 2008/0040313 A1 | 2/2008 | Schachter | |
| 2008/0052369 A1 | 2/2008 | Weber et al. | |
| 2008/0052372 A1 | 2/2008 | Weber et al. | |
| 2008/0072145 A1 | 3/2008 | Blanchard et al. | |
| 2008/0091985 A1 | 4/2008 | Haynes et al. | |
| 2008/0097986 A1 | 4/2008 | Shih et al. | |
| 2008/0097987 A1 | 4/2008 | Shih et al. | |
| 2008/0120343 A1 | 5/2008 | Altrichter et al. | |
| 2008/0127133 A1* | 5/2008 | Aghara et al. | 717/140 |
| 2008/0154949 A1 | 6/2008 | Brooks et al. | |
| 2008/0201645 A1* | 8/2008 | Francis et al. | 715/742 |
| 2008/0270924 A1* | 10/2008 | Yordanov et al. | 715/765 |
| 2008/0281769 A1* | 11/2008 | Hibbets | 706/50 |
| 2009/0031401 A1 | 1/2009 | Cudich et al. | |
| 2009/0063442 A1* | 3/2009 | Gaurav et al. | 707/5 |
| 2009/0100358 A1* | 4/2009 | Lauridsen et al. | 715/762 |
| 2009/0100372 A1* | 4/2009 | Lauridsen et al. | 715/781 |
| 2009/0182727 A1 | 7/2009 | Majko | |
| 2009/0217352 A1* | 8/2009 | Shen et al. | 726/3 |
| 2009/0235149 A1 | 9/2009 | Frohwein | |
| 2010/0017385 A1 | 1/2010 | Wilcox et al. | |
| 2010/0070482 A1* | 3/2010 | Punaganti Venkata et al. | 707/706 |
| 2011/0055193 A1 | 3/2011 | Lauridsen et al. | |
| 2011/0106835 A1* | 5/2011 | Lauridsen et al. | 707/769 |
| 2011/0131501 A1 | 6/2011 | Lauridsen et al. | |
| 2011/0271171 A1 | 11/2011 | Wilcox et al. | |
| 2012/0204121 A1 | 8/2012 | Lauridsen et al. | |

FOREIGN PATENT DOCUMENTS

| | | |
|---|---|---|
| JP | 2006107012 | 4/2006 |
| JP | 2007-133871 A | 5/2007 |
| KR | 2006084869 | 7/2006 |

OTHER PUBLICATIONS

International Search Report and Written Opinion dated Dec. 1, 2010 for International Application No. PCT/EP2010/062738, 13 pages.

USPTO U.S. Appl. No. 11/872,238, 2 pages.

USPTO U.S. Appl. No. 11/872,241, 2 pages.

USPTO U.S. Appl. No. 12/174,420, 2 pages.

USPTO U.S. Appl. No. 12/608,423, 2 pages.

"Extensible Markup Language (XML)", World Wide Web Consortium, retrieved in the Internet on May 17, 2008 at http://www.w3.org/XML/, World Wide Web Consortium, Massachusettes Institute of Technology, 32 Vassar Street, Room 32-G515, Cambridge, MA 02139, 5 pages.

"JSR 168: Portlet Specification", Sun Microsystems, retrieved from the Internet on May 17, 2008 at http://www.jcp.org/en/jsr/detail?id=168, Sun Microsystems, Inc., 4150 Network Circle, Santa Clara, CA 95054, 9 pages.

Allamaraju, Subbu et al., "Portlet Preferences", Dev2Dev, Feb. 2, 2004, retrieved from the Internet on May 17, 2008 at http://dev2dev.bea.com/pub/a/2004/02/portlet_preferences.html, World Wide Web Consortium, Massachusetts Institute of Technology, 32 Vassar Street, Room 32-G515, Cambridge, MA 02139, 14 pages.

Diaz, Oscar et al., "Invoking Web Applications from Portals: Customisation Implications", Onekin Research Group, University of the Basque Country, Department of Computer Languages and Systems, PO Box 649, 20080 San Sebastian, Spain, 10 pages.

Diaz, Oscar et al., "Tagging-Aware Portlets", ICWE 2009, LNCS 5648, Engineering, Springer Berlin Heidelberg, Berlin, Heidelberg, Jun. 24, 2009, XP019120503, ISBN: 978-3-642-02817-5, pp. 61-75.

Jing, Wu et al., "Mining personalization Interest and Navigation Patterns on Portal", Advances in Knowledge Discovery and Data Mining, Berlin, Heidelberg, vol. 4426, May 22, 2007, pp. 948-955.

Lauridsen et al., "Summarizing Portlet Usage Captured Responsive to Trigger Events in a Portal Page"; U.S. Appl. No. 12/984,575, filed Jan. 4, 2011.

Diaz, Oscar et al., "Invoking Web Applications from Portals: Customisation Implications", Onekin Research Group, University of the Basque Country, Department of Computer Languages and Systems, PO Box 649, 20080 San Sebastian, Spain, AH2004, LNCS 3137, 2004, pp. 75-84.

Interview Summary mailed Mar. 22, 2011 for U.S. Appl. No. 12/174,420; 4 pages.

USPTO U.S. Appl. No. 12/984,575, 2 pages.

Response to Office Action filed Mar. 24, 2011 for U.S. Appl. No. 12/174,420; 20 pages.

U.S. Appl. No. 12/174,420, filed Jul. 18, 2008, Lamb, Marshall A.

http://support.mozilla.com/en-US/kb/Smart+Bookmarks+folders, accessed Aug. 19, 2009, 6 pages.

"Community Systems Research at Yahoo!", SIGMOD Record, vol. 36, No. 3, Sep. 2007, pp. 47-54.

"Delicioussocial bookmarking", http://del.icio.us, accessed Aug. 19, 2009, 6 pages.

"Developing portlets for offline content", http://publib.boulder.ibm.com/infocenter/weahelp/5.1/index.jsp?topic=/com.ibm.websphere.eas.doc/dev_offline.html, accessed Jul. 17, 2009, 2 pages.

"Dogear Bookmarks", https://www.ibm.com/dogear; https://www.ibm.com/dogear/about?lang=en, accessed Aug. 20, 2009, 6 pages.

"IBM File Server", http://publib.boulder.ibm.com/infocenter/wpdoc/v510/index.jsp?topic=/com.ibm.wp.zos.doc/portlets/file_server.html, 2007, 1 page.
"JSR 162: Portlet API", http://www.jcp.org/en/jsr/detail?id=162, 2002, 6 pages.
"Overview of Offline Portal Content", http://publib.boulder.ibm.com/infocenter/weahelp/5.1/index.jsp?topic=/com.ibm.websphere.eas.doc/ovr_offline.html, accessed Jul. 17, 2009, 2 pages.
Allamaraju, Subbu, "Portlet Preferences", http://web.archive.org/web/20071220054045/dev2dev.bea.com/1pt/a/171; Feb. 2, 2004, accessed Aug. 19, 2009, 8 pages.
Coles, Alistair et al., "A Framework for Coordinated Multi-Modal Browsing with Multiple Clients", WWW 2003, pp. 718-726.
Firan, Claudiu S. et al., "The Benefit of Using Tag-Based Profiles", IEEE, Fifth Latin American Web Congress, 2007, pp. 32-41.
Hepper, Stefan, "Caching data in JSR 168 portlets with WebSphere Portal V5.1", http://www.ibm.com/developerworks/websphere/library/techarticles/0508_hepper/0508_hepper.html, 2005, 9 pages.
Hong, Lichan et al., "SparTag.us: A Low Cost Tagging System for Foraging of Web Content", AVI 2008, pp. 65-72.
Nicklous, Martin S., "JSR 168: Portlet Specification", The Java Community Process (SM) Program, http://www.jcp.org/en/jsr/detail?id=168, accessed Aug. 19, 2009, 11 pages.
Patil, Aashish, "Unclog the server bottleneck with active containers", http://www.ibm.com/developerworks/web/library/wa-actcont/index.html, 2004, 4 pages.
Storey, Margaret-Anne et al., "Waypointing and Social Tagging to Support Program Navigation", CHI 2006, pp. 1367-1372.
Strauss, Howard, "What Is a Portal, Anyway?", TechTalks Event, From Internet, Jan. 20, 2000, 9 pages.
Office Action mailed Oct. 5, 2011 for U.S. Appl. No. 12/508,423; 21 pp.
Response to Office Action filed Dec. 21, 2011 for U.S. Appl. No. 12/608,423; 12 pages.
Final Office Action mailed Jan. 19, 2012 for U.S. Appl. No. 12/608,423; 17 pages.
Office Action mailed Jan. 19, 2012 for U.S. Appl. No. 13/166,394; 24 pages.
Interview Summary mailed Jul. 20, 2012 for U.S. Appl. No. 12/608,423; 3 pages.
Office Action mailed Aug. 10, 2012 for U.S. Appl. No. 12/608,423; 17 pages.
Response to Final Office Action filed Aug. 22, 2012, U.S. Appl. No. 13/166,394, 17 pages.
Final Office Action dated Jun. 20, 2012 for U.S. Appl. No. 13/166,394; 20 pages.
Interview Summary dated Apr. 16, 2012 for U.S. Appl. No. 13/166,394: 4 pages.
Response to Office Action filed Apr. 19, 2012, U.S. Appl. No. 13/166,394, 22 pages.
U.S. Appl. No, 13/420,094, 3 pages.
Final Office Action mailed Nov. 26, 2012, U.S. Appl. No. 12/608,423, 18 pages.
International Search Report and Written Opinion dated Dec. 29, 2008, International Application No. PCT/EP2008/063769, 10 pages.
International Search Report and Written Opinion dated Dec. 29, 2008, International Application No. PCT/EP2008/063770, 10 pages.
Response to Office Action filed with the USPTO on Nov. 9, 2012, U.S. Appl. No. 12/608,423, 12 pages.
Appeal Brief filed Mar. 25, 2013, U.S. Appl. No. 12/608,423, 21 pages.

* cited by examiner

APPLYING USER-GENERATED DEPLOYMENT EVENTS TO A GROUPING OF DEPLOYABLE PORTLETS

BACKGROUND

The present application relates generally to an improved data processing apparatus and method and more specifically to an apparatus and method for applying individual user-generated deployment events to a grouping of bookmarked deployable Web portlets.

A Web portal presents information from diverse sources in a unified way. Apart from the standard search engine feature, Web portals may offer other services, such as e-mail, news, stock prices, information gathering, and entertainment. Portals provide a way for enterprises to provide a consistent look and feel with access control and procedures for multiple applications, which otherwise would have been different entities altogether.

Portlets are pluggable user interface software components that are managed and displayed in a web portal. Portlets produce fragments of markup code that are aggregated into a portal page. Typically, following the desktop metaphor, a portal page is displayed as a collection of non-overlapping portlet windows, where each portlet window displays a portlet. Hence, a portlet (or collection of portlets) resembles a web-based application that is hosted in a portal. Some examples of portlet applications are email, weather reports, discussion forums, and news.

An archive file is a file that is composed of one or more files along with metadata that can include source volume and medium information, file directory structure, error detection and recovery information, and file comments. An archive file usually employs some form of lossless compression. Archive files may also be encrypted in part or as a whole. Archive files may also be used to collect multiple data files together into a single file for easier portability and storage.

An Enterprise ARchive, or EAR, is a file format used by Java™ platform, Enterprise Edition for packaging one or more modules into a single archive so that the deployment of the various modules onto an application server happens simultaneously and coherently (Java is a trademark of Sun Microsystems, Inc. in the United States, other countries, or both). An EAR also contains extensible markup language (XML) files, called deployment descriptors, which describe how to deploy the modules. A Web archive file, or portlet, is deployed by creating an instance of the Web archive file at the server within a Web portal such that a client application, i.e. a Web browser, may receive a presentable instance of the Web portal including the portlet.

Social bookmarking is a method for Internet users to store, organize, search, and manage bookmarks of Web pages on the Internet with the help of metadata, typically in the form of tags. In a social bookmarking system, users save links to Web pages that they want to remember and/or share. These bookmarks are usually public, and can be saved privately, shared only with specified people or groups, shared only inside certain networks, or another combination of public and private domains. The allowed people can usually view these bookmarks chronologically, by category or tags, or via a search engine.

A tag is a non-hierarchical keyword or term assigned to a piece of information, such as an internet bookmark, digital image, or computer file. This kind of metadata helps describe an item and allows it to be found again by browsing or searching. Tags may be chosen informally and personally by the item's creator and/or by its viewer, depending on the system.

Many social bookmark services encourage users to organize their bookmarks with informal tags instead of the traditional browser-based system of folders, although some services feature categories/folders or a combination of folders and tags. They also enable viewing bookmarks associated with a chosen tag, and include information about the number of users who have bookmarked them. Some social bookmarking services also draw inferences from the relationship of tags to create clusters of tags or bookmarks. Many social bookmarking services provide Web feeds for their lists of bookmarks, including lists organized by tags. This allows subscribers to become aware of new bookmarks as they are saved, shared, and tagged by other users.

SUMMARY

In one illustrative embodiment, a method, in a data processing system, is provided for applying user generated deployment events to groupings of portlets. The method comprises receiving, from a requesting user, search criteria to be applied to a set of stored portlets, identifying one or more portlets from the set of stored portlets satisfying the search criteria, and deploying the one or more portlets in one or more portal tabs within a Web portal of the requesting user. Each portlet within the set of stored portlets is a pluggable user interface software component that is managed and displayed in a Web portal.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for applying individual user-generated deployment events to a grouping of bookmarked deployable Web portlets. The mechanism allows a user of a bookmarking service for deployable Web portlets to group bookmarked Web portlets according to criteria, such as tag names, and to perform actions, such as a deploy action, to all members of the group in a single user-generated event. The mechanism allows a user to perform a search of portlets meeting specified criteria. The user may then select portlets from the result set for deployment as a group. Alternatively, the mechanism may return a specified number of resulting portlets as a group, deployed as a portal tab.

The mechanism also allows a user of the bookmarking service to tag pre-configured portlet groupings, or portal tabs. Bookmarking portal tabs, or other selected sets of portlet groupings, allows users to share personal configurations and layouts of portlets. Users may choose to deploy not just a tagged portlet, but an entire tab of portlets in a single deployment action. The mechanism may also allow a user to deploy a collection of portal tabs.

Figure 1:
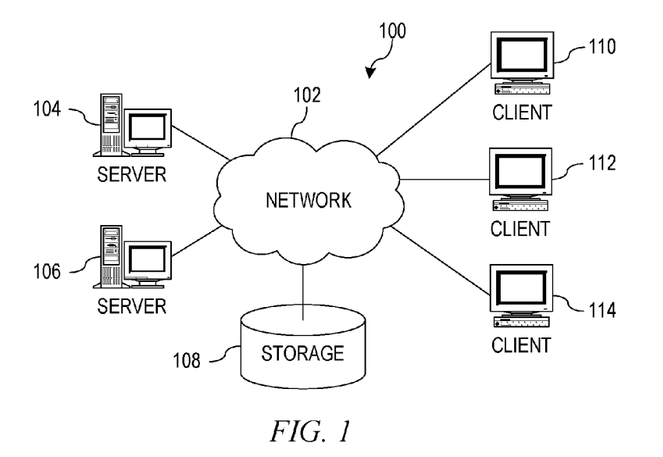
FIG. 1 depicts a pictorial representation of an example distributed data processing system in which aspects of the illustrative embodiments may be implemented.
Figure 2:
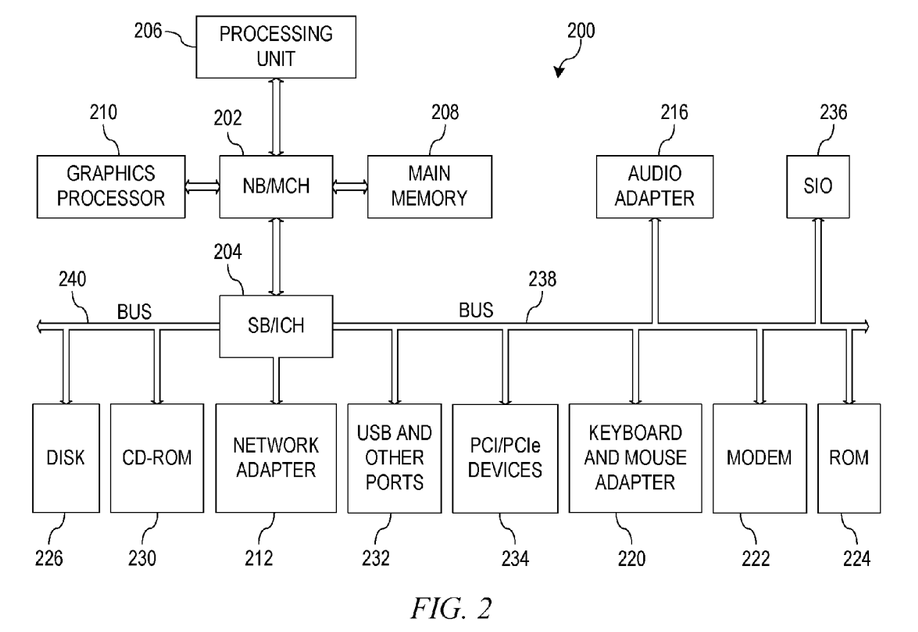
FIG. 2 depicts a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments in which Web archive files (portlets), and groups of portlets, are bookmarked, tagged, and deployed.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In accordance with an illustrative embodiment, server 104, for example, may be a Web application server running a Web portal application and a bookmarking service. The bookmarking service may allow users at clients 110, 112, 114 to bookmark deployable Web archive files, i.e. deployable portlets. The bookmarking service may also allow users at clients 110, 112, 114 to group bookmarked Web archive files according to criteria, such as tag names, and to perform actions, such as a "deploy" action, to all members of the group in a single user-generated event.

For example, a user may choose to deploy all portlets (or up to a specified number of the most relevant) with a particular portlet tag, or portlets that meet some other criteria, such as deployed or tagged within a given time period by members of a particular group, with a single "deploy" event. The deploy event launches the specified portlet group within a new portal "tab," within the user's portal.

The illustrative embodiments allow the user of the bookmarking service to bookmark and tag pre-configured portlet groupings, or portal tabs. Bookmarking portal tabs or other selected sets of portlet groupings allows users to share their personal configurations and layouts of portlets. Users may choose to deploy not just a tagged portlet, but an entire tab of portlets. As an extension of tagged portlet groupings, an example embodiment may also allow users to tag, bookmark, and deploy collections of portal tabs.

Furthermore, the illustrative embodiments allow the users of the bookmarking service to tag a larger grouping, and optionally allow a multitude of portlets in that grouping (e.g., deployed in a tab) to inherit the tag(s) of the larger grouping. Conversely, the illustrative embodiments may allow the users of the bookmarking service to allow the portlet grouping, or portal tab, to inherit the tag(s) of the individual portlets in the group.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
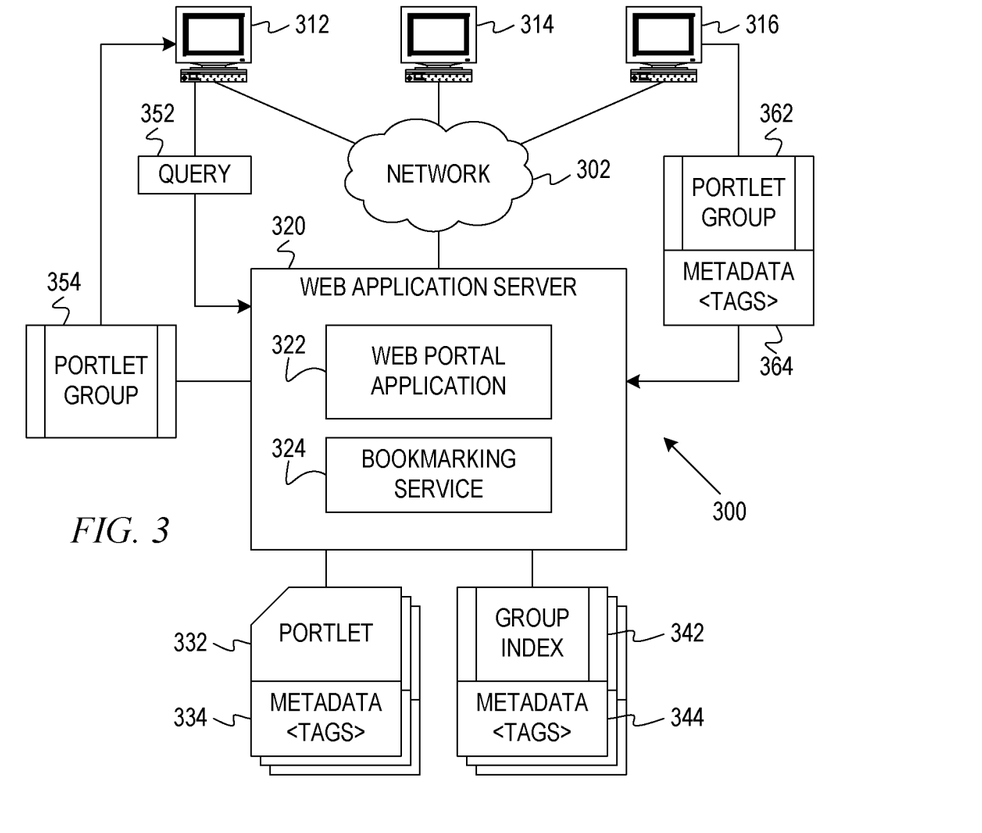
FIG. 3 is a diagram depicting a system for applying user-generated events to a grouping of bookmarked deployable Web archive files in accordance with an illustrative embodiment.

FIG. 3 is a diagram depicting a system for applying user-generated events to a grouping of bookmarked deployable Web archive files in accordance with an illustrative embodiment. In system 300, clients 312, 314, 316 connect to Web application server 320 via network 302. Web application server 320 comprises Web portal application 322 and bookmarking service 324. In accordance with the illustrative embodiment, bookmarking service 324 allows users at clients 312, 314, 316 to bookmark deployable Web archive files, i.e. deployable portlets viewable via Web portal application 322. Bookmarking service 324 may also allow users at clients 312, 314, 316 to group bookmarked Web archive files according to criteria, such as tag names, and to perform actions, such as a "deploy" action, to all members of the group in a single user-generated event.

Web application server 320 may comprise software running on one or more data processing systems, such as one of servers 104 and 106 in FIG. 1, for example. Web portal application 322 may be a component of Web application server 320 or may comprise software running on one or more data processing systems. Web portal application 322 may run on the same one or more data processing systems as Web application server 320 or different data processing systems.

Bookmarking service 324 may be a component of Web application server 320 or may comprise software running on one or more data processing systems. Bookmarking service 324 may run on the same one or more data processing systems as Web application server 320 or different data processing systems.

A user at client 312, for example, may submit query 352 to Web application server 320 to request all portlets (or up to a specified number of the most relevant) with a particular portlet tag, or portlets that meet some other criteria, such as deployed or tagged within a given time period by members of a particular group. Web application server 320 and Web portal application store portlets 332 with associated metadata 334. The metadata 334 may include, for example, for each individual portlet, developer assigned tags, user assigned tags, identification of users who have deployed the portlet, timestamp for the time/date that the portlet was deployed or tagged, popularity or number of tags/deployments, etc. Metadata 334 may be formed based on interaction with Web portal application 322 and bookmarking service 324 by users of clients 312, 314, 316.

Web application server 320 and Web portal application 322 receive query 352 and identify portlets among portlets 332 that satisfy query 352 based on metadata 334. Web application server 320 may then generate portlet group 354 based on the results of processing query 352, and return portlet group 354 to client 312. A user at client 312 may then view portlet group 354 and select all or a subset of the portlets within portlet group 354 to deploy in a portal tab within the user's portal. That is, the user may deploy all or a subset of the portlets within portlet group 354 using a single deploy event. The deploy event launches the specified portlet group within a new portal "tab," within the user's portal via Web portal application 322.

The user at client 312 may individually select portlets within portlet group 354 from a list presented on a social bookmarking Web site via bookmarking service 324. For example, the user may perform a control+click action or may right-click on a portlet to activate an option for deploying in a tab. The user may also perform an advanced "search and deploy" query in which the user defines tag/attribute search criteria and chooses to automatically deploy a specified number of results matching the query as a group or portal tab. Once deployed, the portlet group 354, or portal tab, may be used as any other user-defined portal tab within Web portal application 322. The end user may edit a tab once she has chosen the tab for deployment.

Bookmarking service 324 may then add metadata to portlets 332 as a result of deployment as a group. For example, for a given portlet 332, bookmarking service 324 may add to metadata 334 a separate user-defined tag, or set of tags, identifying the portal tab or grouping 354 with which the portlet has been deployed. Bookmarking service 324 may then retrieve this metadata 334 for subsequent viewing or searching.

A user at client 316, for example, may generate a portlet group 362 or portal tab, either by individually selecting portlets using Web portal application 322 or by submitting a query or "search and deploy" query, as described above. The user may assign, via the user interface provided within the portal tab by Web portal application 322, a tag or set of tags for the portlet group 362. Client 316 may then submit these tags, and other attributes, to Web application server 320 as metadata 364 in association with portlet group 362. For instance, the user at client 316 may select a "save" feature for the portal tab within the user's portal.

The user may manually enter one or more tags for portlet group 362 or may be presented with an option to select from tags that are already applied to the individual portlets within the portlet group 362. Portlets residing in a tagged tab, or other tagged grouping of portlets, may inherit the tag(s) of the tab or larger grouping so that they may be individually found and deployed based on the inherited tags, as well as the tags they already possessed. The end user tagging a tab or grouping may also choose to allow the portlets deployed within the portal tab to inherit the same tag(s).

Bookmarking service 324 may automatically flag a portlet that is added for deployment to a tagged tab or other tagged grouping as a potential inheritor of the tag(s) already applied to the tab or larger grouping. The end user may be given the option, during deployment of a portlet within a portal tab, to allow the new portlet to inherit the tag(s) of the portal tab. Bookmarking service 324 may automatically flag a portlet that is added for deployment to a tab that contains other tagged portlets as a potential inheritor of the tag(s) of the other portlets in that portlet group. The end user may be given the option to apply the tags of the other portlets in the same group, collectively or individually, upon choosing to assign a tag to the newly deployed portlet.

Responsive to Web application server 320 receiving portlet group 362 and associated metadata 364, bookmarking service 324 may generate an instance of the portlet group by creating a group index 342 with reference to data structures containing: portal grouping identifier, tags, references to portlets contained within the grouping, information about deployment, such as who deployed or tagged the grouping, when the portlet group was tagged or deployed, how frequently the portlet group was tagged or deployed, and so forth. Bookmarking service 324 then stores this information as metadata 344 in association with the group index 342. Web application server 320 then stores a plurality of deployed portlet groups, such as portlet group 362, by creating group indexes 342 and associated metadata 344, each group index 342 and associated metadata 344 representing an instance of a portlet group or portal tab.

An augmented search capability of bookmarking service 324 may allow users of clients 312, 314, 316 to search not only individual tabbed portlets, but also tagged portlet groupings. Web portal application may then deploy groups of portlets through a selection list or via an advanced "search and deploy" query or action. If a user selects multiple portlet groups from a list, then Web portal application 322 may deploy each portlet group as a tab in a Web portal.

Upon deploying a portlet group, a user may select a new name for the tab and edit tags corresponding to the tab to fit the portal environment of the user. A user who deploys a tab or portlet group that has been bookmarked by another user may deploy the tab such that the metadata containing configuration options and information about layout, skins, and placement of the portlets is by default those of the other user. The user may then choose to edit these configuration options and settings upon deployment within her own portal.

As an example implementation, a recently promoted director may be preparing for a meeting with her executive manager in which all financial information for her sales organization will be reviewed. One of her direct reports, a manager in the team "Software Sales" has deployed several finance portlets and has grouped them into a tab entitled "Software Sales Finances." The financial information includes results from sales in multiple regions and for multiple product lines. The manager has six different portlets deployed corresponding to quota management, sales by regions, employee performance, and summaries of costs, expenses, and revenue, all grouped under the "Software Sales Finances" tab that she created. The newly promoted director knows that one of the managers on her team has this collection of finance portlets deployed in a portal tab. She also knows that portlet bookmarking capability allows her to search for the manager's bookmarked portlets. The director may find each portlet if that portlet is bookmarked, and deploy each one in her own tab. The new director uses the social bookmarking service in her portal to view the bookmarks of the manager, sorts by tag name, and finally sees all of the finance portlets. One by one, she chooses to deploy them. Choosing portlets individually, this would take many clicks and the director would have to regroup them in a tab of her own, setting the configuration again.

However, using the aspects of the illustrative embodiments, the director may simply visit the social bookmarking service within her portal. She navigates to her employee group and finds the manager who has grouped the portlets she needs. The director may browse not only the bookmarked portlets, but also the bookmarked tabs (and groups of tabs) of her employees. She sees that the manager has bookmarked the "Software Sales Finances" tab, which contains the configuration options for the portal tab and portlets. She can now deploy the entire tab, portlets included, with a single deploy event. She also has the option of changing the name of the tab at this time. The new portal tab, and all portlets deployed in the tab, are created. With a simple search and a single deploy event, the director is presented with the information she needs to be prepared for her meeting.

Figure 4:
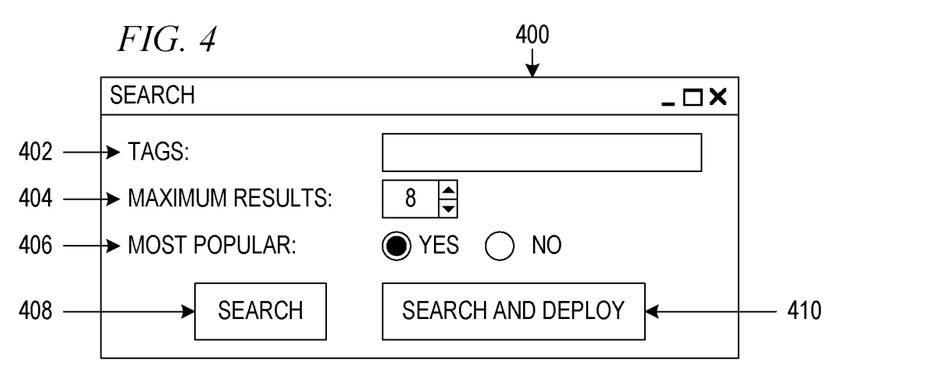
FIG. 4 depicts an example screen of display for performing a search in accordance with an illustrative embodiment.

FIG. 4 depicts an example screen of display for performing a search in accordance with an illustrative embodiment. Search dialog 400 presents controls for performing search of portlets to form a portlet group or portal tab, including a tags text entry control 402, a maximum results selection control 404, and a most popular radio button control 406, for example. In the depicted example, the user may enter one or more tags for searching portlets in tags text entry control 402. For instance, the user may enter a single tag or a string of tags delineated by commas in control 402.

Using maximum results selection control 404, the user may select a number of portlets matching the search query to return in the resulting portlet group. The most popular radio button control 406 allows the user to instruct the Web application server to return only the most popular portlets, e.g., the eight most popular portlets in this instance. Search dialog 400 may include more or fewer controls for defining a search query depending upon the implementation. For example, search dialog 400 may include controls for selecting particular users who have tagged or deployed portlets, how recently portlets have been tagged or deployed, and so forth.

Search dialog 400 includes "search" button 408. If the user selects "search" button 408, the Web application server will return a list of portlets matching the query for selection by the user. Search dialog 400 also includes "search and deploy" button 410. If the user selects "search and deploy" button 410, the Web application server and Web portal application will deploy the resulting group of portlets as a portal tab.

Figure 5:
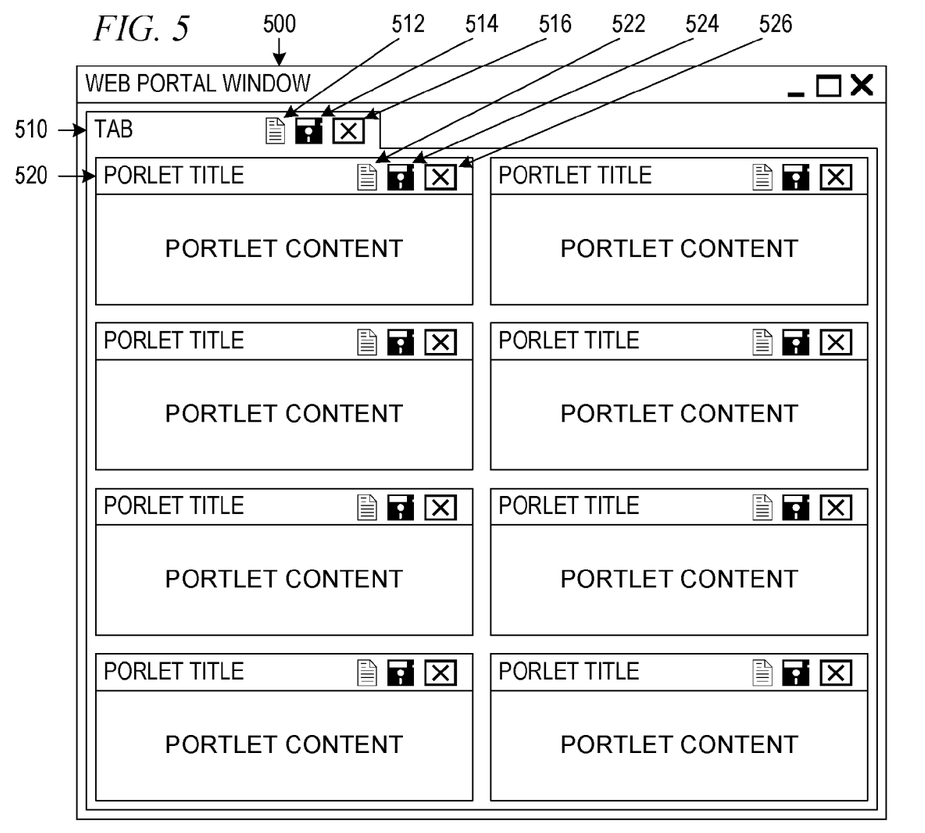
FIG. 5 depicts an example screen of display of a Web portal window in accordance with an illustrative embodiment.

FIG. 5 depicts an example screen of display of a Web portal window in accordance with an illustrative embodiment. Web portal window 500 includes a tab 510 comprising a plurality of portlets 520. Each portlet 520 comprises a portlet properties control 522, a save control 524, and a close control 526. Selection of the portlet properties control 522 causes a portlet properties dialog to be presented. Using the properties dialog, the user may define various properties of the portlet, such as tags and configuration and layout options, for example. If the user selects save control 524, the client submits the portlet and associated metadata, including the defined properties, to the Web application server. If the user selects the close control 526, then the Web portal application removes the portlet from the portal tab.

Portal tab 510 comprises a tab properties control 512, a tab save control 514, and a close control 516. Selection of the tab properties control 512 causes a tab properties dialog to be presented. Using the tab properties dialog, the user may define various properties of the tab, such as tags and configuration and layout options, for example. If the user selects tab save control 514, the client submits the portlet group and associated metadata, including the defined tab properties, to the Web application server. If the user selects the close control 516, then the Web portal application removes the tab from the portal.

Figure 6:
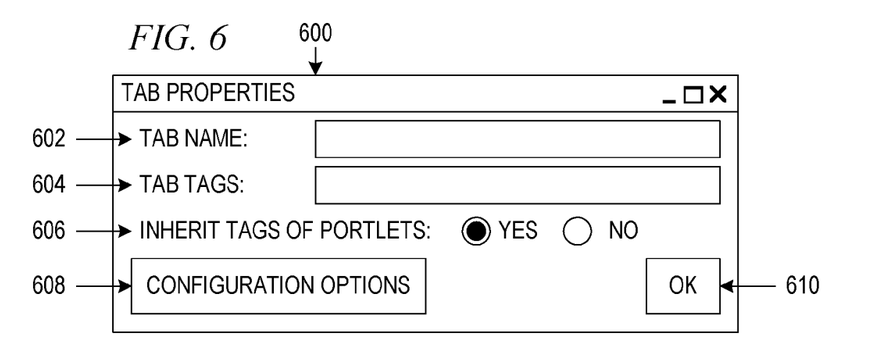
FIG. 6 depicts an example screen of display of a tab properties dialog in accordance with an illustrative embodiment.

FIG. 6 depicts an example screen of display of a tab properties dialog in accordance with an illustrative embodiment. Tab properties dialog 600 may be displayed responsive to selection of tab properties control 512 in FIG. 5, for example. Tab properties dialog 600 comprises various controls for defining properties of a portal tab and, hence, a portlet group. Tab properties dialog 600 includes a tab name text field 602, a tab tags text field 604, an inherit tags of portlets radio button control 606, and a configuration options control 608. In tab name text input field 602, the user may enter a name for the portal tab or portlet group. Using tab tags text input field 604, the user may enter one or more tags to be associated with the portal tab or portlet group.

Inherit tags of portlets radio button control 606 allows the user to select whether the portal tab inherits all tags of the portlets it contains. Alternatively, tab properties dialog 600 may include a tag selection control (not shown) that is initially populated with all tags of the portlets within the portal tab. The user may then keep the tags to be inherited or remove tags that are not to be applied to the portal tab.

Selection of configuration options control 608 causes a configuration options dialog (not shown) to be displayed. Within the configuration options dialog, the user may select configuration and layout options for the portal tab. The configuration and layout options may be stored within metadata associated with the portal tab or portlet group.

When the user is finished defining tab properties in tab properties dialog 600, the user may select the "OK" button control 610. Selection of "OK" button control 610 causes the tab properties to be associated with the portal tab or portlet group.

Figure 7:
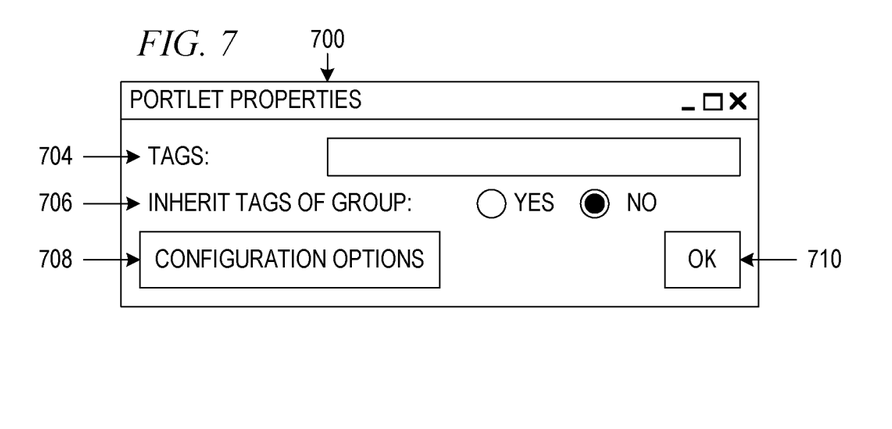
FIG. 7 depicts an example screen of display of a portlet properties dialog in accordance with an illustrative embodiment.

FIG. 7 depicts an example screen of display of a portlet properties dialog in accordance with an illustrative embodiment. Portlet properties dialog 700 may be displayed responsive to selection of portlet properties control 522 in FIG. 5, for example. Portlet properties dialog 700 comprises various controls for defining properties of a portlet. Portlet properties dialog 700 includes a tags text field 704, an inherit tags of group radio button control 706, and a configuration options control 708. Using tags text input field 704, the user may enter one or more tags to be associated with the portlet.

Inherit tags of group radio button control 706 allows the user to select whether the portlet inherits all tags of the portlet group in which it resides. Alternatively, portlet properties dialog 700 may include a tag selection control (not shown) that is initially populated with all tags of the portlet group. The user may then keep the tags to be inherited or remove tags that are not to be applied to the portlet.

Selection of configuration options control 708 causes a configuration options dialog (not shown) to be displayed. Within the configuration options dialog, the user may select configuration and layout options for the portlet. The configuration and layout options may be stored within metadata associated with the portlet.

When the user is finished defining portlet properties in portlet properties dialog 700, the user may select the "OK" button control 710. Selection of "OK" button control 710 causes the portlet properties to be associated with the portlet.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
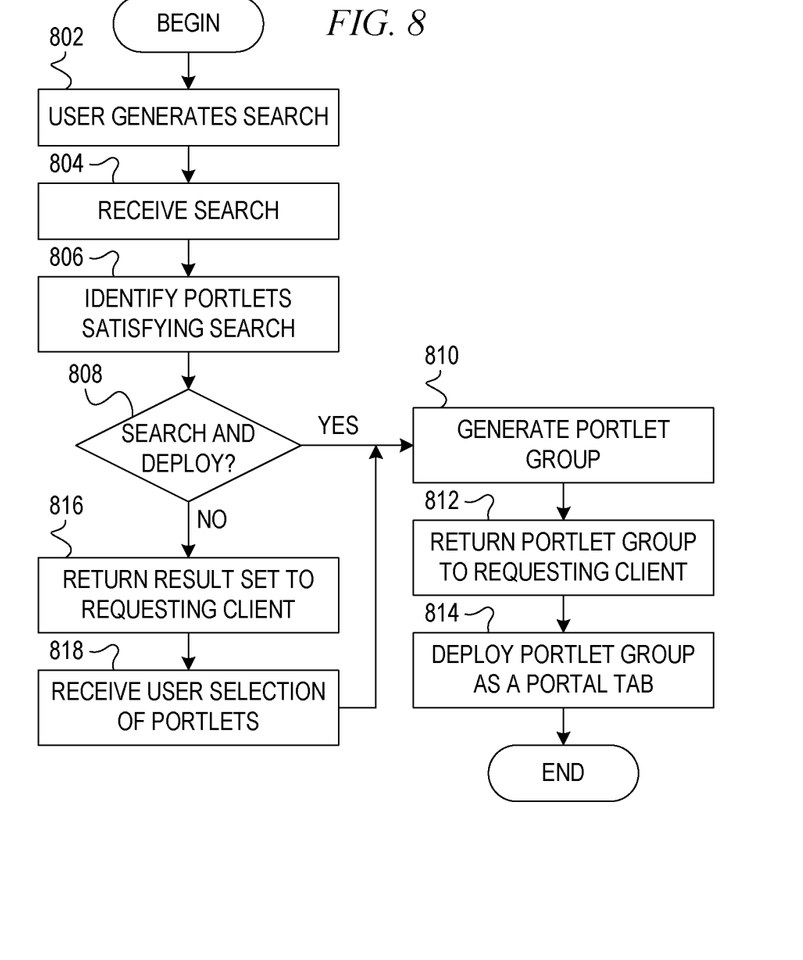
FIG. 8 is a flowchart illustrating operation of a system for applying user generated deployment events to a grouping of bookmarked deployable Web archive files in accordance with an illustrative embodiment.

FIG. 8 is a flowchart illustrating operation of a system for applying user generated deployment events to a grouping of bookmarked deployable Web archive files in accordance with an illustrative embodiment. Operation begins, and a user generates a search query (block 802). The system receives the search query (block 804), and identifies portlets satisfying the search (block 806). The system then determines whether a "search and deploy" option is indicated in the search query (block 808).

If a search and deploy option is indicated in the search query, the system generates a portlet group (block 810) containing the portlets identified in block 806. The system then returns the portlet group to the requesting client (block 812) and deploys the portlet group as a portal tab in a portal of the requesting user (block 814). Thereafter, operation ends.

If a search and deploy option is not indicated in the search query in block 808, the system returns the result set from block 806 to the requesting client (block 816). The system then receives user selection of portlets to be included in a portlet group (block 818). Thereafter, operation proceeds to block 810 to generate the portlet group. Then, the system returns the portlet group to the requesting client (block 812) and deploys the portlet group as a portal tab (block 814). Thereafter, operation ends.

Figures 9, 10:
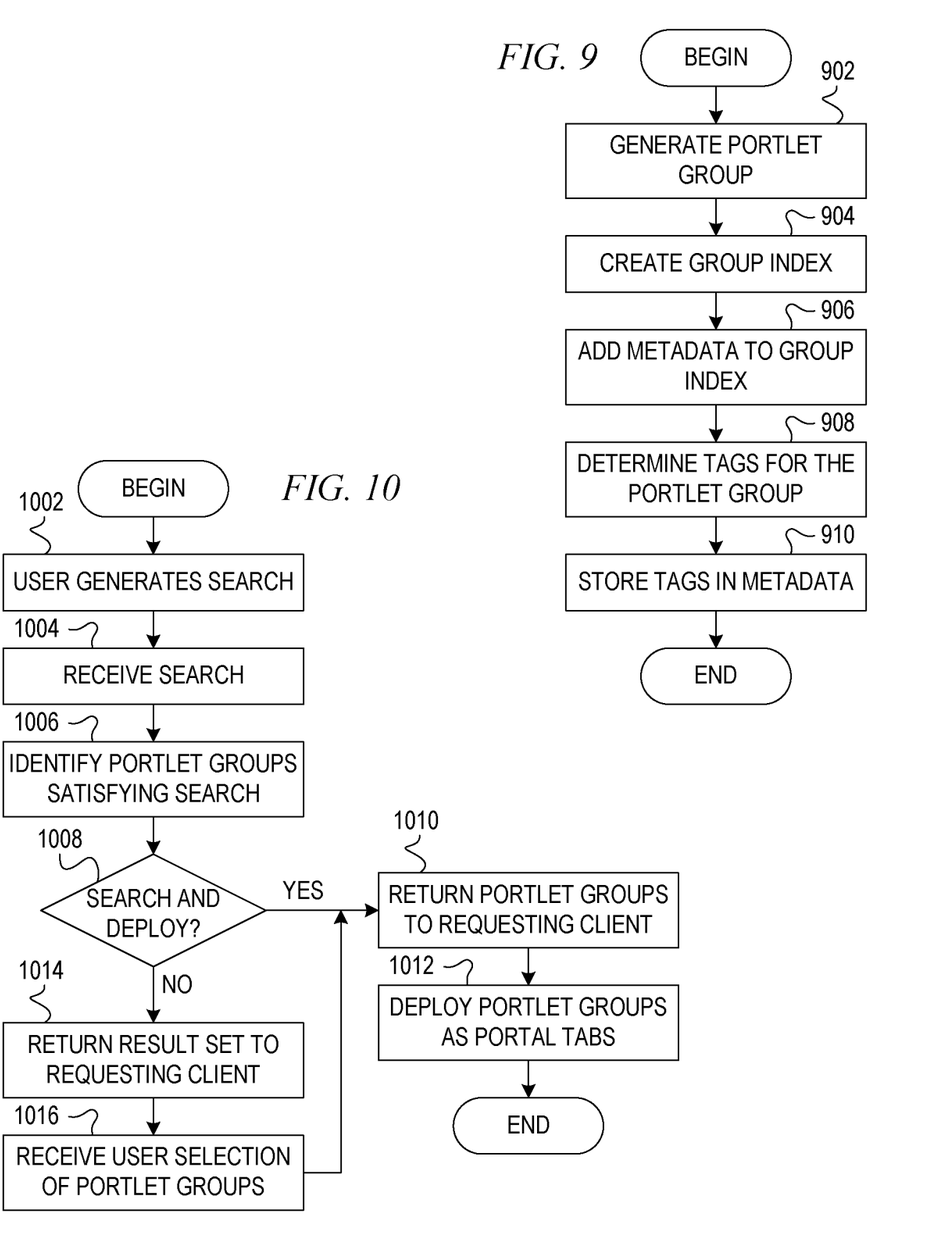
FIG. 9 is a flowchart illustrating operation of a system for generating a portlet group for subsequent search, retrieval, and deployment as a portal tab in accordance with an illustrative embodiment.
FIG. 10 is a flowchart illustrating operation of a system for applying user generated deployment events to a grouping of bookmarked portlet groups or portal tabs in accordance with an illustrative embodiment.

FIG. 9 is a flowchart illustrating operation of a system for generating a portlet group for subsequent search, retrieval, and deployment as a portal tab in accordance with an illustrative embodiment. Operation begins, and the system generates a portlet group (block 902). This portlet group may include portlets individually selected by a user or resulting from a search as described above with respect to FIG. 8. The system then creates a group index (block 904). The system adds metadata in association with the group index (block 906). Then, the system determines tags for the portlet group (block 908). These tags may include tags assigned by the user or tags inherited from the individual portlets, for example. The system then stores the tags in the metadata associated with the portlet group (block 910). Thereafter, operation ends.

FIG. 10 is a flowchart illustrating operation of a system for applying user generated deployment events to a grouping of bookmarked portlet groups or portal tabs in accordance with an illustrative embodiment. Operation begins, and a user generates a search query (block 1002). The system receives the search query (block 1004), and identifies portlet groups satisfying the search (block 1006). The system then determines whether a "search and deploy" option is indicated in the search query (block 1008).

If a search and deploy option is indicated in the search query, the system returns a set of portlet groups containing the portlet groups identified in block 1006 to the requesting client (block 1010). The system then deploys each portlet group as a portal tab in a portal of the requesting user (block 1012). Thereafter, operation ends.

If a search and deploy option is not indicated in the search query in block 1008, the system returns the result set from block 1006 to the requesting client (block 1014). The system then receives user selection of portlet groups to be deployed as portal tabs (block 1016). Thereafter, operation proceeds to block 1010 to return the portlet groups to the requesting client. The system then deploys each portlet group as a portal tab in a portal of the requesting user (block 1012). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for applying individual user-generated deployment events to a grouping of bookmarked deployable Web archive files. The mechanisms allow a user of a bookmarking service for deployable Web archive files to group bookmarked Web archive files according to criteria, such as tag names, and to perform actions, such as a deploy action, to all members of the group in a single user-generated event. The mechanisms allow a user to perform a search of portlets meeting specified criteria. The user may then select portlets from the result set for deployment as a group. Alternatively, the mechanisms may return a specified number of resulting portlets as a group, deployed as a portal tab.

The mechanisms also allow a user of the bookmarking service to tag pre-configured portlet groupings, or portal tabs. Bookmarking portal tabs, or other selected sets of portlet groupings, allows users to share personal configurations and layouts of portlets. Users may choose to deploy not just a tagged portlet, but an entire tab of portlets in a single deployment action. The mechanisms may also allow a user to deploy a collection of portal tabs.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for applying user generated deployment events to groupings of portlets, the method comprising:

receiving, from a requesting user, search criteria to be applied to a set of stored portlets, wherein each portlet within the set of stored portlets is a pluggable user interface software component that is managed and displayed in a Web portal and wherein the search criteria comprise one or more tag keywords;

generating a result set of portlets, wherein the result set of portlets comprises a plurality of portlets from the set of stored portlets that satisfy the search criteria and wherein portlets within the result set of portlets have one or more associated portlet tags matching the one or more tag keywords;

returning the result set of portlets to the requesting user;

receiving a selection of a subset of the result set of portlets from the requesting user; and deploying the subset of the result set of portlets in one or more portal tabs within a Web portal of the requesting user.

2. The method of claim 1, wherein the result set of portlets comprises: one or more portlet groups that satisfy the search query.

3. The method of claim 2, wherein deploying the subset of the result set of portlets comprises: deploying each of the one or more portlet groups as a portal tab in the Web portal of the requesting user.

4. The method of claim 1, further comprising:
receiving one or more tag keywords to be assigned to the portal tab; and
storing the one or more tag keywords in association with the portal tab.

5. The method of claim 4, wherein storing the one or more tag keywords in association with the portal tab comprises:
generating a group index with reference to data structures containing a portal grouping identifier, the one or more tag keywords, and references to the one or more portlets; and
storing the reference to the data structures as metadata in association with the group index.

6. A computer program product comprising a non-transitory computer readable storage medium having a computer readable program recorded thereon, wherein the computer readable program, when executed on a computing device, causes the computing device to:
receive, from a requesting user, search criteria to be applied to a set of stored portlets, wherein each portlet within the set of stored portlets is a pluggable user interface software component that is managed and displayed in a Web portal and wherein the search criteria comprise one or more tag keywords;
generate a result set of portlets, wherein the result set of portlets comprises a plurality of portlets from the set of stored portlets that satisfy the search criteria and wherein portlets within the result set of portlets have one or more associated portlet tags matching the one or more tag keywords;
return the result set of portlets to the requesting user;
receive a selection of a subset of the result set of portlets from the requesting user; and
deploy the subset of the result set of portlets in one or more portal tabs within a Web portal of the requesting user.

7. The computer program product of claim 6, wherein the result set of portlets comprises: one or more portlet groups that satisfy the search query.

8. The computer program product of claim 7, wherein deploying the subset of the result set of portlets comprises: deploying each of the one or more portlet groups as a portal tab in the Web portal of the requesting user.

9. The computer program product of claim 6, wherein the computer readable program further causes the computing device to:
receive one or more tag keywords to be assigned to the portal tab; and store the one or more tag keywords in association with the portal tab.

10. The computer program product of claim 9, wherein storing the one or more tag keywords in association with the portal tab comprises:

generating a group index with reference to data structures containing a portal grouping identifier, the one or more tag keywords, and references to the one or more portlets; and
storing the reference to the data structures as metadata in association with the group index.

11. The computer program product of claim 6, wherein the computer readable program is stored in a non-transitory computer readable storage medium in a data processing system and wherein the computer readable program was downloaded over a network from a remote data processing system.

12. The computer program product of claim 6, wherein the computer readable program is stored in a non-transitory computer readable storage medium in a server data processing system and wherein the computer readable program is downloaded over a network to a remote data processing system for use in a non-transitory computer readable storage medium with the remote system.

13. An apparatus, comprising:
a Web application server;
a Web portal component; and
a bookmarking service component,
wherein the Web application server is configured to receive, from a requesting user, search criteria to be applied to a set of stored portlets, wherein each portlet within the set of stored portlets is a pluggable user interface software component that is managed and displayed in a Web portal and wherein the search criteria comprise one or more tag keywords;
wherein the bookmarking service component is configured to generate a result set of portlets, wherein the result set of portlets comprises a plurality of portlets from the set of stored portlets that satisfy the search criteria and wherein portlets within the result set of portlets have one or more associated portlet tags matching the one or more tag keywords;
wherein the Web application server is configured to return the result set of portlets to the requesting user and receive a selection of a subset of the result set of portlets from the requesting user; and
wherein the Web portal component is configured to deploy the one or more portlets in subset of the result set of portal tabs within a Web portal of the requesting user.

14. The apparatus of claim 13, wherein the result set of portlets comprises identifying one or more portlet groups that satisfy the search query, wherein the Web portal component is configured to deploy each of the one or more portlet groups as a portal tab in the Web portal of the requesting user.

15. The apparatus of claim 13, wherein the bookmarking service component is further configured to:
receive one or more tag keywords to be assigned to the portal lab; and
store the one or more tag keywords in association with the portal tab.

* * * * *